No. 692,446. Patented Feb. 4, 1902.
N. D. HOPKINSON.
PNEUMATIC TUBE PROTECTOR.
(Application filed Apr. 8, 1901.)
(No Model.)
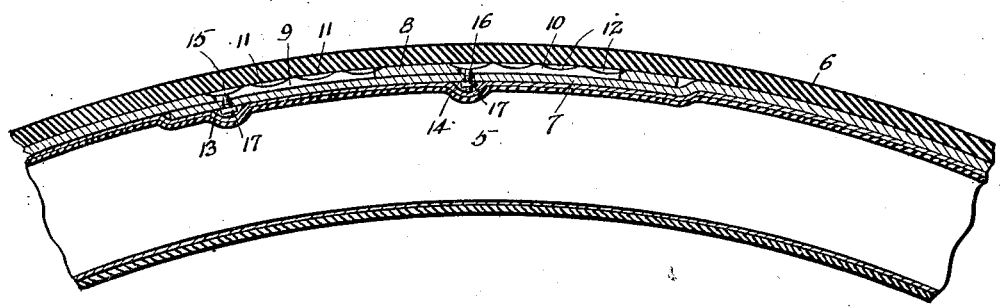
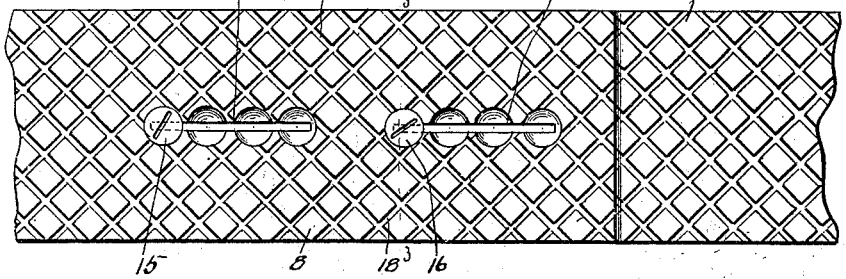
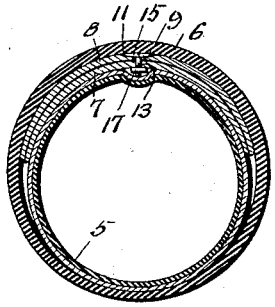 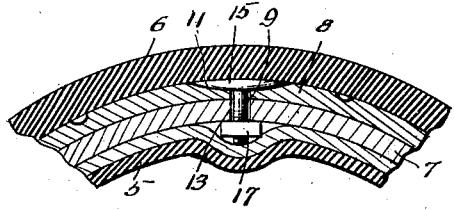
Witnesses
F. E. Alden
Geo. K. Chandler
N. D. Hopkinson, Inventor
by C. A. Snow & Co.
Attorneys

UNITED STATES PATENT OFFICE.

NAAMAN D. HOPKINSON, OF SPOKANE, WASHINGTON.

PNEUMATIC-TUBE PROTECTOR.

SPECIFICATION forming part of Letters Patent No. 692,446, dated February 4, 1902.

Application filed April 8, 1901. Serial No. 54,880. (No model.)

*To all whom it may concern:*

Be it known that I, NAAMAN D. HOPKINSON, a citizen of the United States, residing at Spokane, in the county of Spokane and State of Washington, have invented a new and useful Pneumatic-Tube Protector, of which the following is a specification.

This invention relates to protectors for pneumatic tubes, such as are used for the tires of vehicle-wheels; and it has for its object to provide a simple and efficient construction which may be readily applied to a tire and may be adjusted to fit tires of different diameters, a further object of the invention being to provide a construction wherein the outer surface will be without ridges, such as will make projections upon the tire, while means will be provided for preventing deflection of nails or tacks so as to tear the tire.

Other objects and advantages of the invention will be apparent from the following description.

In the drawings forming a portion of this specification, and in which like numerals of reference indicate similar parts in the several views, Figure 1 is a longitudinal section through a portion of a tire provided with the present protector and showing the construction and arrangement thereof. Fig. 2 is a plan view of the protector, showing the means for preventing deflection of tacks or nails and showing also the means for holding the overlapped ends of the protector together. Fig. 3 is a transverse section on line 3 3 of Fig. 1. Fig. 4 is a detail sectional view showing the arrangement of one of the clamping-bolts for holding the overlapped ends of the protector.

Referring now to the drawings, there is shown a portion of a pneumatic tire including an inner air-tube 5 and an outer shoe 6, these members being of any form desired, and between this air-tube and the shoe is disposed the present protector on the tread side of the air-tube and in position to prevent access of a tack, nail, or other puncturing body to the air-tube.

The protector consists of a hoop of very thin steel, brass, aluminium, or other suitable metal and which is arc-shaped in cross-section, the end portions of this hoop being shown at 7 and 8, the terminal portions of these ends being disposed one upon the other or overlapped and the underlying end 7 being offset, as shown, so that the overlying end 8 will have its outer surface flush with the outer surface of the end 7 beyond the offset portion. With this formation of the protector a plain or substantially smooth surface is presented to the inner face of the shoe 6.

In order that the circumference of the protector may be adjusted to conform to tires of different diameters or to compensate for inflation of a tire and also to hold the overlapping ends of the protector in alinement against lateral movement which would tend to cut and thus destroy the inner tube, an overlying end 8 is provided with two alining slots 9 and 10, running longitudinally of the protector and opening into which are countersinks 11 and 12, respectively, while in the underlying end 7 are formed two perforations 13 and 14 for registration with the slots, respectively. Two bolts 15 and 16 are provided, and one of them is passed inwardly through each of the slots, these bolts having heads which are shaped to fit into the countersinks 11 and 12, respectively, to lie flush with the end 8. When a bolt is engaged with a countersink, its stem of course passes through the slot and is passed also through a corresponding perforation in the end 7, and engaged with the inner end of the bolt is a nut 17 to prevent displacement of the bolt. Thus by loosening the nuts of the two bolts they may be drawn outwardly to a degree sufficient to raise their heads from the countersinks, and the ends 7 and 8 may be then slid longitudinally one of the other, and when adjusted to the proper degree the nuts may be screwed up to draw the heads into the countersinks to lock the ends against further movement.

It will be noted upon reference to Fig. 2 of the drawings that the outer surface of the protector is checkered by the formation of diagonal grooves 18 and 19, lying at right angles to each other, and thus when a tack or other object enters through the shoe 6 and strikes the protector it will be deflected only as far as a groove, into which it will engage, and striking a wall thereof will be prevented from passing back through the shoe or otherwise cutting a large hole.

What is claimed is—

1. A protector for bicycle-tires having its outer surface provided with intersecting grooves which run diagonally of the tread of the tire.

2. A protector for vehicle-tires having its outer surface provided with intersecting grooves which run diagonally of the tread of the tire and its ends overlapped, one of the overlapped ends having a plurality of longitudinal slots, the side walls of which are recessed, and the other end having perforations for alinement with the slots, and clamping-bolts adapted for engagement with the slots and perforations and to hold the overlapping ends of the protector against lateral movement, thus to protect the inner tube from injury, and having heads adapted to enter the recesses interchangeably to hold the ends in different positions and to lie flush with the protector.

In testimony that I claim the foregoing as my own I have hereto affixed my signature in the presence of two witnesses.

NAAMAN D. HOPKINSON.

Witnesses:
E. B. HOPKINSON,
WM. HEATON.